United States Patent Office 3,095,392
Patented June 25, 1963

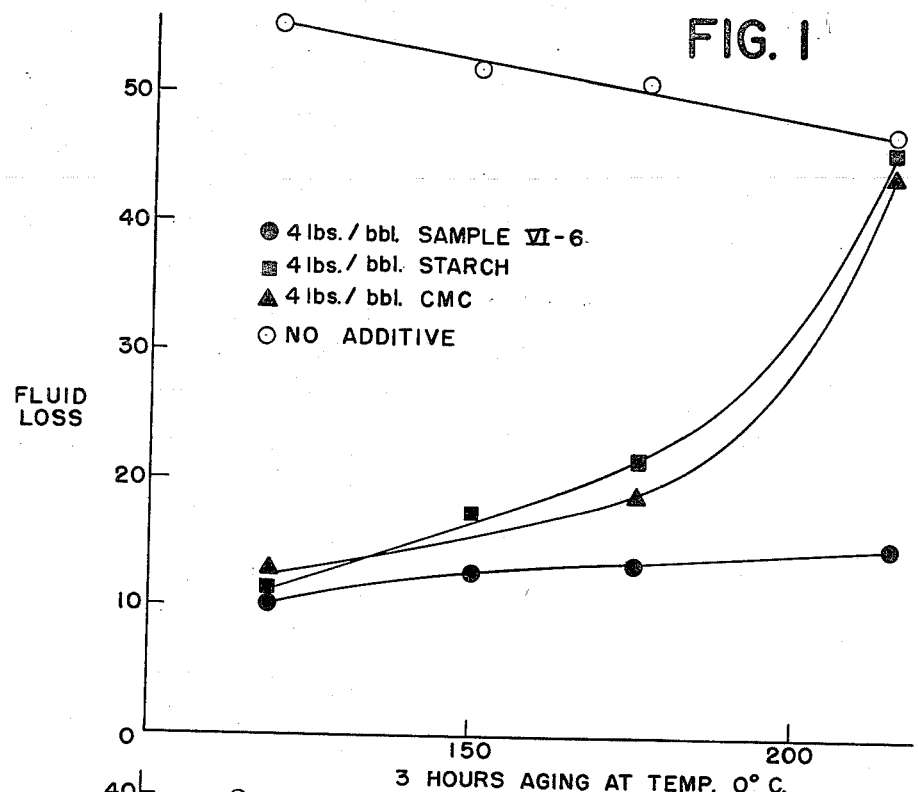
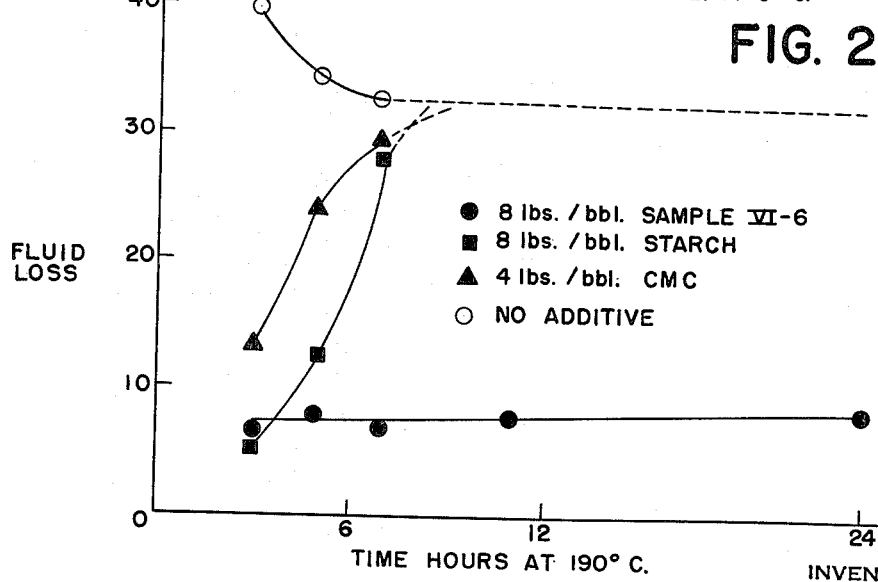

3,095,392
WATER-SOLUBLE SULFITED LIGNIN-PHENOLIC-FORMALDEHYDE COMPLEX
Franklin W. Herrick, Shelton, Wash., assignor to Rayonier Incorporated, Shelton, Wash., a corporation of Delaware
Filed Apr. 15, 1959, Ser. No. 806,545
13 Claims. (Cl. 260—17.5)

This invention relates to the utilization of the lignosulfonates contained in the waste liquors resulting from the digestion of wood to form cellulosic products, and has for an object the provision of certain water-soluble polymeric complexes of sulfited lignin crosslinked with a polymethylolphenol having a formaldehyde-to-phenol mole ratio of from 2.0 to 3.0, and a process of producing the lignin-phenolic complexes.

In the production of cellulose from wood, the pulp and paper industry has long been faced with the difficult problem of disposing of vast quantities of lignin-rich spent digestion liquors. The present invention provides a practical use for some of this material. I have discovered a broad class of useful lignin-containing products which can be prepared from such spent liquors in a comparatively simple manner. In the process of this invention, lignin-rich digestion liquors, after concentration (and sulfiting, if necessary) are partially condensed with certain polymethylolphenols under carefully controlled conditions to form water-soluble products.

The water-soluble products of the invention are the controlled condensation products of sulfited lignin and a polymethylolphenol having a formaldehyde-to-phenol mole ratio of from 2.0 to 3.0. The product is advantageously recovered from the solution in which it is formed and dried to form a free-flowing powder, for example, by spray or drum drying by conventional means.

As is well known in the well drilling art, the clay-containing fluids known as drilling muds which are used to cool the drill bit and remove cuttings from the hole must have certain well defined characteristics. Among these are low viscosity and gel strength, and the ability to maintain these properties in the face of the inevitable contamination picked up from the formation being drilled. Drilling muds must also be able to plaster-out a thin sheath of impervious matter on the walls of the hole with a low filterability factor, and must have the ability to prevent appreciable loss of fluid from the mud into the formation surrounding the hole and ingress of contaminating fluids such as salt water into the hole. Another characteristic drilling muds should have is the ability to resist the adverse effects of heat and pressure. In the present day of ever deepening wells, high temperatures and pressures are met with more and more frequently at the bottom of the hole. High temperatures and pressures tend to cause the colloidal components of aqueous drilling muds to flocculate and thereby adversely raise their viscosities and gel strengths and fluid loss. These conditions also destroy the effectiveness of the more common organic control agents. The products of the present invention, when used as viscosity and fluid loss control agents in aqueous drilling muds, resist flocculation due to contamination and high temperature more effectively than most other agents used for the purpose. The invention, accordingly, provides improved aqueous clay-containing drilling muds comprising the water-soluble sulfited lignin-polymethylolphenol product as a viscosity and fluid loss control agent.

Considerable Portland cement is used in well drilling for segregating fluid bearing zones, in casing off troublesome formations and to protect casings. Cementing operations of this type can usually be accomplished without difficulty in shallower wells. Modern deep holes, however, with their high bottom temperatures and pressures present a problem. Under high temperature and pressure conditions, a Portland cement slurry will tend to lose fluid to the formation being drilled and to set up with greatly increased speed, causing serious difficulties. The adverse effects of contamination also become more evident. Various reagents, therefore, are commonly added to cement slurries used in deep wells, including such materials as modified starches, casein, lignosulfonates and polyvinyl alcohol, to help control the fluid loss. I have discovered that the products of my invention are effective fluid loss control agents for Portland cement slurries under the foregoing conditions. The water-soluble compounds of the invention provide improved fluid loss control agents for Portland cement slurries.

The products of this invention are prepared by partially condensing a sulfited, lignin-rich, highly-polymerized spent digestion liquor complex with a relatively low molecular weight polymethylolphenol. The sulfited lignin-rich component can be either a concentrated spent sulfite liquor itself, a concentrated sulfited black liquor or a sulfited lignin fraction of either. As is well known, spent digestion liquors are exceedingly complex mixtures of organic and inorganic compounds.

The major solid component of a spent sulfite liquor is lignosulfonate, but it also contains up to 20 to 30 percent carbohydrates along with smaller amounts of waxes, resins and excess digestion chemicals. For the purpose of this invention, the lignosulfonates are believed to be the only components of value. Theoretically, therefore, it would be desirable to separate-out the lignosulfonate fraction and purify it for condensation with the polymethylolphenol. Fortunately, however, I have found the extraneous materials in this type of spent liquor to be relatively innocuous, so that it is practical to concentrate the liquor for condensation as is. In practicing the invention, it is my preferred practice, therefore, to take the spent sulfite liquor, whether sodium, calcium, ammonium or magnesium-base, and concentrate it to from 20 to 50 percent total solids content while maintaining it on the alkaline side (with caustic if necessary) to preserve the solubility of the lignosulfonate. The concentrated liquor is then ready to be condensed with the polymethylolphenol without further treatment to form the products of the invention.

Spent alkaline (black) digestion liquors, such as result from the kraft process, present more of a problem than the foregoing spent sulfite liquors when used as a source of lignin-rich materials. While they can be sulfited and concentrated for use as is, the product obtained by condensing them with polymethylolphenol are less effective than products obtained by using the separated alkali lignin component. Difficulties arise because of the complex character of black liquors, and they usually contain a larger percentage of the non-functional extraneous materials. Furthermore, the lignin component therein is present as an alkali metal salt which is only soluble in alkaline solutions. As a result, it is expedient to remove the alkali lignin from a black liquor by precipitating it with acid or some equivalent method rather than using the black liquor itself. After washing with water, the purified alkali lignin is solubilized by sulfiting and dissolved in water at the proper concentration for condensing with the alkaline polymethylolphenol solution as before. Products obtained in this manner are less complex, and their characteristics can be controlled more closely.

If it is desired to remove the lignosulfonates from a spent sulfite liquor before condensation with polymethylolphenol to improve control or for any other reason, one good method for doing so is by treatment of the liquor with the carboxylic acid-type cation-active ion exchange resins described in U.S. Patent 2,801,994. There are other well-known methods that can be used also.

The polymethylolphenol to be condensed with the sulfited lignin is prepared by reacting phenol or metacresol or mixtures of phenols having at least two free hydrogen positions with sufficient formaldehyde in alkaline solution to form a product having a formaldehyde-to-phenol mole ratio within the range of 2.0–3.0. Advantageously, this mole ratio will be as high as convenient within the given limits in order to facilitate condensation with the sulfited lignin concentrates. Care should be taken not to exceed the upper limit of 3.0 moles formaldehyde per mole of phenol in order to avoid the presence of excess free-formaldehyde, which is undesirable. In this operation, condensation should be through polymethylolphenol linkages rather than through formaldehyde linkages. The polymethylolphenol I desire is the polymer ranging from the monomer (dimethylol or trimethylolphenol) to, say, the pentamer, and mixtures thereof, with the major portion being in the dimer and trimer stage.

Formaldehyde reacts very rapidly with phenol in the presence of substantial amounts of caustic. Under proper conditions, exothermic heat can be used to raise the temperature to reflux (about 93° C.). In my preferred process I make use of this fact and mix together formaldehyde, phenol and sodium hydroxide in a mole ratio of 2.6:1.0:0.75 in a more or less conventional type of continuous reactor where the reagents are pumped through various controlled heat zones. The foregoing mixture rapidly reaches reflux temperature and is allowed to remain there until the exotherm subsides, at which time it is cooled to room temperature to stop the reaction. At this point it will have a viscosity of about 40 to 50 centipoises (measured at 25° C. and total solids content of 44 to 45%) and be in proper condition for the ensuing condensation step. As will be obvious to one skilled in the art, similar polymethylolphenols can be prepared by other methods. I prefer continuous methods for economic reasons and for better continuity in the quality of the product. Batch processes, however, have their advantages in some installations.

The amount of caustic used in preparing the polymethylolphenol can be varied from about 0.25 to 1.0 mole per mole of phenol if appropriate changes are made in reaction times and temperatures. I prefer to use the polymethylolphenol as formed without removal of the residual caustic.

The final stage in the preparation of the improved products of the present invention comprises reacting together suitable proportions of the foregoing sulfited lignins and the polymethylolphenol solution to form condensation products with a limited amount of crosslinking. The product is then spray or drum dried in the conventional manner.

The foregoing final reaction stage comprises a process of condensing lignosulfonate molecules through polymethylolphenol chains in which the methylol groups react with open positions on the aromatic nuclei of phenolic units in the lignosulfonate molecules. The over-all reaction also has other complications. Spent sulfite liquor is a heterogeneous material, and the preferred reaction conditions are known to promote extensive desulfonation of lignosulfonate molecules. The presence of considerable amounts of wood sugars in the mixture often presents an appreciable variable, since such sugars are degraded by alkaline reaction media. The important factor, however, is that some of the methylol groups are inactivated with respect to condensation reactions by displacement as formaldehyde (which, in turn, is destroyed by the well-known Cannizzaro reaction) and by reaction with sulfite ions to form sulfomethyl groups. The addition of controlled amounts of sulfite during the condensation step serves to broaden the scope and utility of the invention. The sulfomethyl groups thus formed increase the water solubility of the final product, and also provide a secondary means of controlling the extent of the crosslinking that takes place between the lignin and the polymethylolphenol by blocking a desired portion of the active centers on the polymethylolphenol component.

In the preparation of the improved products of this invention, a fairly wide variation in the extent of condensation and crosslinking can be tolerated. Preferably, however, it should approach, but not attain, the point of incipient water insolubility. Probably the best indicator available for following the progress of the reaction is the increase in viscosity that occurs. I have found that as the desired point is neared, the viscosity will start to rise rapidly, say from 10 to 1000-fold, depending upon the initial viscosity, the concentration of solids, the phenol-to-lignin ratio and other factors such as pH, temperature, etc. Under the preferred reaction conditions, the viscosities of the condensed product solution will normally run between about 10 and 1000 poises when measured at 25° C. and a total solids content of 25%. Useful products, however, can be prepared with viscosities outside this range.

I have discovered that the utility of the improved products can be increased if the average size of the molecules comprising the same, as determined by the extent of condensation, is tailored to the intended end use. This is especially true where they are to be used as fluid loss control agents in drilling muds and Portland cement slurries. In the latter case, the average molecular size can advantageously be much smaller than in the former. The average molecular size can be effectively controlled within rather broad limits by the ratio of spent liquor solids to polymethylolphenol. To illustrate this fact, the preferred process for preparing a viscosity and fluid loss control agent for a drilling mud is as follows: A concentrated spent sulfite liquor (or equivalent soluble sulfited alkali lignin) containing from 20 to 25% total solids is reacted with an alkaline polymethylolphenol solution containing between 44 and 45% total solids in the presence of a 14% sodium sulfite solution in the ratio of 100 parts spent liquor solids to 38 parts polymethylolphenol solids and 5 parts sodium sulfite for 30 minutes at 150° C. The reacted mixture is cooled to room temperature to stop the reaction and spray dried by conventional means to form a tan-colored powdered product. This product is an outstandingly effective fluid loss control agent for clay-containing drilling muds, even under very adverse conditions.

In contrast to the foregoing, the preferred process for preparing a fluid loss control agent for Portland cement slurries is as follows: The same polymethylolphenol solution and 14% sodium sulfite solution are used as before, but the concentration of the spent liquor is increased to contain 45 to 50% solids. The three reagents are mixed in the same reactor as before in the ratio of 100 parts spent liquor solids to 19 parts polymethylolphenol solids and 10 parts sodium sulfite. The mixture is reacted for only 15 minutes at 150° C. before cooling and spray drying. The product in this case will have a considerably smaller average molecular size and be found to have exceptionally good properties when used as a fluid loss control agent in Portland cement slurries.

The polymethylolphenol being prepared from phenol itself or combinations of other phenols which yield difunctional methylol derivatives with formaldehyde is comparatively more costly than the sulfited spent liquor solids. For this reason, economy directs that the ratio of polymethylolphenol to spent liquor solids be kept as low as feasible—consistent, of course, with the desired characteristics of the final product. In this respect, I have found that useful products can be prepared using a range of polymethylolphenol to spent liquor solids ranging from a low of about 0.05 part phenol (in polymethylolphenol) to 1.0 part spent liquor solids to a high of about 1.0 part phenol to 1.0 part spent liquor solids. For reasons of economy, however, I prefer to stay within a range of about 0.1–0.2 part phenol per part spent liquor solids.

The following examples illustrate embodiments of my invention, and the accompanying drawings illustrate graphically the use of the complexes in certain drilling muds.

PREPARATION OF POLYMETHYLOLPHENOL

Examples I and II illustrate batchwise methods for preparing polymethylolphenol solutions from phenol and formaldehyde which are of utility in this invention. Example III illustrates a continuous process, and Example IV the use of a common commercial mixture of technical-grade cresols and formaldehyde.

Example I

A reaction vessel equipped with an efficient cooling coil, a mechanical stirrer and reflux condenser was charged with 88.5 parts of phenol. To this was added a solution of 213 parts of 34.5% formaldehyde, 26.6 parts of sodium hydroxide and 50 parts of water. The mixture was stirred without heating. The temperature rose rapidly because of the exothermic character of the reaction, and reached reflux temperature (93° C.). After refluxing for about 10 minutes, the reaction subsided and the solution was cooled to room temperature by running cold water through the cooling coil. Analysis for formaldehyde in the finished solution showed this to be absent. Titration with 0.1 N hydrochloric acid showed 25 parts NaOH remaining. The loss of NaOH is accounted for by the Cannizzaro reaction, and corresponds to the reaction of 2.4 parts of formaldehyde. The remainder of the formaldehyde condensed with the phenol, the mole ratio of the same being 2.52 to 1.0. The solution was very thin (less than 10 centipoises at 25° C. and a concentration of 45.0% cured resin solids). The solution was ready for use.

Example II

A reaction vessel equipped with mechanical agitator, reflux condenser, cooling jacket and temperature recorder was charged with 25.4 parts of phenol and 54 parts of 37% formaldehyde. The agitator was started and the solution cooled to 20–25° C., whereupon 20.6 parts of 36% NaOH was added. The temperature rose from the heat of reaction to 65° C. in 13 minutes. Cooling water was then turned into the jacket and the temperature rose more gradually to 85° C. in 8 minutes. Hot water was then turned into the jacket to bring the reaction temperature to 92° C. where the mixture refluxed. The hot water was turned off and the mixture continued to reflux for 30 minutes, at which time cold water was turned into the jacket to cool the mixture and stop the reaction. The resultant solution had a specific gravity of 1.195, a cured resin solids content of 47.2% and a viscosity of 41 centipoises at 25° C. Analysis indicated a combined formaldehyde-to-phenol mole ratio of 2.45 to 1.0.

Example III

A continuous reactor was devised from coiled tubing immersed in a series of controlled temperature water baths, a mixing tank, metering devices, pumps, temperature controls and containers for the product. In a 75-hour run, a feed solution containing 19.0–19.2% formaldehyde, 22.9–23.2% phenol, 7.8–8.1% NaOH and 49.8–50.0% water (equivalent to a mole ratio of 2.6 moles formaldehyde to 1.0 mole phenol to 0.8 mole NaOH) was metered through the reactor at a rate so adjusted as to provide a retention time between 65 and 70 minutes at a reaction temperature of 87° C. The polymethylolphenol product, when cooled to stop the reaction, had a concentration of 43–44% cured resin solids, a viscosity between 40 and 50 centipoises at 25° C. and a combined formaldehyde-to-phenol mole ratio between 2.15 and 2.35 to 1.0. It was in proper condition for use in condensation.

Example IV

The reaction apparatus of Example I was charged with 108 parts of a commercial mixture of technical-grade cresols containing 54% m-cresol, 29% p-cresol and 17% other phenols and 209 parts of a 34.5% formaldehyde solution. These reagents were cooled to 20° C. and a solution containing 30 parts of NaOH dissolved in 50 parts of water was added with stirring. Cold water was circulated through the cooling coil, and in 3 minutes the reaction temperature rose to 90° C. The water was then used to cool the product to room temperature. The finished solution had a viscosity of 48.5 centipoises at 25° C. and contained 43% cured resin solids and no free formaldehyde. The mole ratios of formaldehyde and NaOH to cresols in the reaction mixture were 2.4 and 0.75 respectively.

In a like manner, various other polymethylolphenols were prepared using mole ratios of sodium hydroxide to phenol of 0.25–1.0 and mole ratios of formaldehyde-to-phenol of 2.0–3.0. I prefer not to separate the resultant polymethylolphenols from the solution in which they are formed because the residual NaOH in said solutions stabilizes the polymethylolphenols and aids in the condensation reaction.

CONDENSATION OF THE SULFONATED LIGNIN AND POLYMETHYLOLPHENOL

A brief description of the condensation step has already been given. Examples V through VIII illustrate this step in more detail.

Example V

This example illustrates a process that was used to prepare the improved products of this invention from (1) ammonium base, (2) sodium base, (3) calcium base, and (4) magnesium base spent sulfite liquors.

(1) *Ammonium base liquor.*—A jacketed autoclave with the usual provisions for temperature controls was charged with the following mixture: 250 parts ammonia-base spent sulfite liquor solids (from commercial wood pulp production), 204 parts of the polymethylolphenol solution of Example II and 12.5 parts of anhydrous $Na_2SO_3$ dissolved in 865 parts of water. The mixture had a total solids content of 25.2%, a pH of 9.1 and viscosity of 8.5 centipoises at 25° C. Condensation was accomplished by sealing the autoclave and heating the mixture for 30 minutes at 150° C. with continuous agitation. It was then cooled to room temperature to stop the reaction. The pH was found to be 5.8 and the viscosity 12.5 centipoises at 25° C. This solution was spray dried using a 315° C. inlet gas temperature to yield a free-flowing tan-colored powder.

(2) *Sodium base liquor.*—Using the same apparatus as above, 250 parts sodium-base spent sulfite liquor solids, 204 parts of the polymethylolphenol of Example II, 25 parts NaOH and 963 parts water were heated to 150° C. for 30 minutes and cooled to room temperature to stop the reaction. Before reaction, this mixture had a total solids content of 25%, a pH of 11.4 and viscosity of 6.5 centipoises at 25° C. After condensation, it was a soft gel which was diluted with water before spray drying.

(3) *Calcium base liquor.*—Using the same apparatus as before, a mixture comprising 250 parts calcium-base spent sulfite liquor solids, 102 parts of the polymethylolphenol solution of Example II, 12.5 parts NaOH and 661 parts water was reacted at 150° C. for 30 minutes and cooled to room temperature. Before reaction, the mixture had a pH of 10.5, a viscosity of 12 centipoises at 25° C. and a total solids content of 29.8%. After condensation, the viscosity was 120 centipoises and the pH 7.4. This pH was raised to 10.0 with caustic before spray drying to improve the solubility of the product.

(4) *Magnesium base liquor.*—Using the same apparatus, a mixture comprising 200 parts magnesium-base spent sulfite liquor solids, 80 parts of the polymethylolphenol of Example II, 20 parts NaOH and 550 parts water was reacted at 150° C. for 30 minutes, then cooled to stop the reaction and spray dried as before. The original mixture had a pH of 10.4, a viscosity of 19.5 centipoises at 25° C. and a total solids content of 27.8%. After condensation, the pH was 8.2 and the viscosity 31.5 centipoises at 25° C.

Each of the foregoing products was tested as viscosity and fluid loss control agents in clay-containing aqueous drilling muds of the type used in well drilling with excellent results, as will be shown in later examples.

*Example VI*

As previously mentioned, spent sulfite liquors, regardless of base, are useful for condensation with polymethylolphenol to form the improved products of the present invention. For convenience, a large sample of spent ammonia-base sulfite liquor was obtained from a commercial operation and used as a common source of sulfonated lignin material for the products set out in Table I. It should be understood, however, that similar results can be obtained using any other of the common types of sulfite spent liquors, if desired.

The following table indicates, in a general way, how the characteristics of the final condensed product will change with variations in the processing conditions and ratios of reagents used. The effectiveness of the various products as fluid loss control agents for aqueous clay-containing drilling muds and cement slurries are shown in later examples. The polymethylolphenol solution in each case was that of Example II.

sulfiting, within reasonable limits, is not very critical as long as solubility of the alkali lignin component is attained. This is demonstrated in this section of the example wherein the black liquor is sulfited approximately twice as much as in (*a*).

A second portion of the black liquor used in (*a*) was concentrated to contain 26.6% total solids. 1507 parts of this concentrate (400 parts solids on a dry basis) was mixed with 84 parts ammonium sulfite monohydrate dissolved in 100 parts water and placed in the same autoclave as before. The mixture was reacted at 150° C. for 30 minutes. The sulfonated black liquor had a pH of 10.3 and a total solids content of 25%.

(*c*) *Sulfited ash-free alkali lignin.*—An autoclave was charged with 300 parts dry basis of a water-insoluble ash-free alkali lignin obtained from kraft black liquor by acid precipitation, 45 parts anhydrous sodium sulfite, 6 parts NaOH and 1041 parts water. The mixture was reacted at 150° C. for 60 minutes and cooled to room temperature. The product was a completely water-soluble sulfonated alkali lignin in a solution having a pH of 7.8 and a total solids content of 24.8%. It was in proper condition to condense with polymethylolphenol to form the improved products of this invention.

(*d*) *Sulfited ash-free alkali lignin.*—I have found that the temperature used in sulfiting alkali lignin is not very critical for purposes of the present invention. For example, suitable sulfited alkali lignins have been prepared at temperatures ranging from 60 to 180° C. providing that suitable adjustments were made in reaction time and concentration of chemicals. This section of the example illustrates the preparation of a suitable solubilized alkali lignin at atmospheric pressure and reflux temperature (99° C.). It was necessary to double the reaction time, however.

TABLE I

| Sample No. | Ratio phenol to spent liquor solids | Ratio, chem. to spent liquor solids | | Reaction conditions | | | | | | |
|---|---|---|---|---|---|---|---|---|---|---|
| | | NaOH | Na₂SO₃ | Time, min. | Temp., °C. | Total solids | pH | | Viscosity centipoises | |
| | | | | | | | Init. | Final | Init. | Final |
| 5 | 0.4 | None | None | 50 | 98 | 30 | 9.7 | ------ | 20.5 | Gel |
| 6 | 0.2 | None | 0.05 | 30 | 150 | 26 | 9.4 | 5.3 | 7.0 | 13.0 |
| 7 | 0.2 | 0.05 | None | 30 | 150 | 25 | 9.9 | 8.2 | 7.5 | 55.0 |
| 8 | 0.1 | 0.1 | None | 30 | 150 | 34.8 | 10.7 | 9.4 | 21.0 | Gel |
| 9 | 0.1 | None | 0.1 | 15 | 150 | 36.6 | 9.2 | 5.1 | 25.0 | 54.0 |
| 10 | 0.2 | None | 0.05 | 10 | 150 | 25.5 | 8.9 | 5.1 | 7.0 | 23.0 |
| 11 | 0.1 | 0.07 | None | 15 | 150 | 35.4 | 10.1 | 6.4 | 15.0 | Gel |

*Example VII*

Kraft type black liquors contain large amounts of alkali lignin that is commonly burnt in the recovery process for inorganic cooking chemicals. This example illustrates the preparation of the improved products of the present invention from this discarded material. Sections (*a*) and (*b*) demonstrate a process for using the alkali lignin without removing it from the black liquor and sections (*c*) and (*d*) a process including removal of the alkali lignin by the usual acid-precipitation method.

(*a*) *Sulfited kraft black liquor.*—A portion of kraft spent liquor (black liquor) was concentrated to contain 26.6% total solids. 1130 parts of this solution (300 parts solids on a dry basis) was mixed with 31.5 parts ammonium sulfite monohydrate dissolved in 100 parts water, put in an autoclave and heated to 150° C. and maintained there for 30 minutes in order to sulfonate and solubilize the alkali lignin therein. The resultant sulfited black liquor had a pH of 10.5 and contained 24% total solids. Ammonium sulfite monohydrate was used as sulfiting agent rather than SO₂ as a matter of convenience. Either will work.

(*b*) *Sulfited kraft black liquor.*—The extent of the

A reactor was charged with 300 parts dry basis of the same ash-free alkali lignin as used in section (*c*), 45 parts anhydrous Na₂SO₃, 6 parts NaOH and 1041 parts water. The mixture was reacted at 99° C. for 120 minutes and then cooled to room temperature. The sulfited alkali lignin was now completely water-soluble and in proper condition for condensing with polymethylolphenol. The solution had a pH of 7.5 and a total solids content of 24.8%.

For the purpose of the present invention, I have found spent sulfite liquor solids and sulfonated alkali lignin solids to be about equally useful and more or less interchangeable. Both types of material can be condensed with the same types of polymethylolphenol to give similar improved products. The following table lists the conditions and proportions of the reagents used in condensing sulfonated alkali lignins and black liquors with the polymethylolphenol of Example II. Condensation was conducted in the same manner as in Example V. Heating was continued for 30 minutes in each case after which the mixture was cooled to room temperature and spray dried in the usual manner.

TABLE II

| Sample | Sulfited material of section | Ratio phenol to sulfited liq. solids | Reaction conditions | | | |
|---|---|---|---|---|---|---|
| | | | Total sol., percent | pH | | Visc., cps. |
| | | | | Init. | Final | Init. | Final |
| 12 | (a) | 0.1 | 26.0 | 10.4 | 11.0 | 8 | Gel |
| 13 | (b) | 0.2 | 25.6 | 10.3 | 10.8 | 6 | Gel |
| 14 | (c) | 0.05 | 25.4 | 9.7 | 9.8 | 17.5 | 63.5 |
| 15 | (c) | 0.1 | 24.6 | 9.6 | 9.9 | 15.5 | 7,200 |
| 16 | (d) | 0.1 | 25.0 | 9.6 | 10.0 | 235 | 4,150 |

While the products of this invention are believed to have interesting possibilities in several directions, their greatest utility at the present time is as fluid loss control agents for drilling muds and Portland cement slurries. The following examples will demonstrate this utility.

The values for the properties of the drilling muds were obtained in the laboratory by procedures developed by the American Petroleum Institute (API), as described in "Recommended Practice for Standard Field Procedure for Testing Drilling Fluids" (API, RR 29, 3rd ed. May 1950), modified by substitution of a Fann V.O. viscometer for the Stormer as suggested by Rogers, "Composition and Properties of Oil Drilling Fluids," 1953 ed., pp. 103, 104. Important properties that were determined include viscosity, 0 and 10 minute gel strengths and fluid loss (often also termed "water loss," "filter loss" or simply "filtration").

Stock supplies of base muds used in testing the various products in types of mud commonly encountered in the field were made up as follows:

A. *Hard water base mud.*—A synthetic hard water was prepared by adding 39 parts $CaSO_4 \cdot 2H_2O$, 18.5 parts $MgSO_4 \cdot 7H_2O$, 46.6 parts $Na_2SO_4 \cdot 10H_2O$ and 22.7 parts NaCl to 12,600 parts of distilled water. To this was added 6000 parts of a low-yield California clay. The mixture was stirred with a high speed propeller-type mixer for 30 minutes after which it was aged overnight at room temperature. Aliquots of this base mud were stirred for 15 minutes at high speed prior to use.

B. *Base mud for gypsum mud tests.*—The stock supply of base mud for the gypsum mud tests was prepared by adding 2500 parts of low-yield California clay, 2500 parts of low-yield Texas shale and 250 parts bentonite (Controlgel) to 15,000 parts of distilled water. This mixture was stirred for 30 minutes at high speed and aged overnight at room temperature also. Aliquots of this base mud were stirred for 15 minutes at high speed before use.

C. *Base mud for sea water mud tests.*—An artificial sea water was prepared by dissolving 225 parts NaCl, 25 parts $CaSO_4 \cdot 2H_2O$ and 10 parts $MgSO_4 \cdot 7H_2O$ in 7500 parts of tap water. To this was added 2500 parts of low-yield California clay and 450 parts bentonite (Controlgel) and the mixture stirred with a high speed propeller type mixer for 30 minutes. It was then aged overnight at room temperature. Aliquots of this mud were stirred 15 minutes at high speed prior to use.

*Example VIII*

The effectiveness of representative products of this invention as fluid loss control agents in hard water drilling muds is shown in Table III below. It will be noted that although no viscosity control agent is used the new fluid loss control agents are able in most cases to perform the dual functions of deflocculant and fluid loss control agent at the same time. This property is a valuable one. Each sample mud in the table was also aged at an elevated temperature (either 70° C. or 190° C.) to set up more difficult conditions for fluid loss control in order to better compare the true effectiveness of the agent being examined.

The samples were prepared for testing by mixing the fluid loss control agent at the rate of 3 lbs./bbl. into an aliquot of the hard water base mud (A) at high speed for 5 minutes. They were then transferred to an aging cell and aged for the indicated time and temperature after which they were removed from the aging cell and mixed once more at high speed for 5 minutes prior to testing.

TABLE III

| Agent Example—Sample | pH of mud | Appar. visc., cps. | Gel strength, lbs./100 sq. ft. | | Fluid loss (API), ml./30 min. |
|---|---|---|---|---|---|
| | | | 0 min. | 10 min. | |
| (Control—Base mud without fluid loss control agent.) | | | | | 35.0 |
| V—(1) | 7.8 | 9 | 5 | 10 | 13.2 |
| V—(2) | 8.4 | 13 | 6 | 12 | 11.5 |
| V—(3) | 8.5 | 9 | 6 | 11 | 19.5 |
| V—(4) | 8.1 | 8 | 6 | 10 | 17.0 |
| VI—(7) | 8.0 | 11 | 6 | 11 | 11.5 |
| VI—(8) | 8.2 | 9 | 6 | 16 | 12.8 |
| VII—(12) | 8.5 | 22 | 17 | 22 | 17.1 |
| VII—(13) | 8.6 | 15 | 13 | 23 | 14.9 |
| VII—(14) | 8.7 | 14 | 7 | 19 | 19.5 |
| VII—(15) | 8.4 | 12 | 7 | 16 | 11.6 |
| VII—(16)[1] | 8.6 | 14 | 9 | 19 | 12.3 |
| (Control—Base mud without fluid loss control agent.) | | | | | 32.0 |
| V—(1) | 8.0 | 14 | 10 | 20 | 13.7 |
| V—(4) | 8.0 | 12 | 8 | 20 | 17.1 |
| VI—(7) | 8.0 | 14 | 11 | 25 | 13.2 |
| VI—(8) | 8.2 | 15 | 8 | 19 | 13.1 |
| VII—(12) | 8.2 | 18 | 40 | 80 | 13.5 |
| VII—(13) | 8.2 | 20 | 25 | 58 | 11.2 |
| VII—(14) | 8.0 | 31 | 15 | 38 | 15.7 |
| VII—(15) | 8.2 | 27 | 12 | 29 | 14.4 |
| VII—(16)[2] | 8.0 | 18 | 14 | 41 | 14.2 |

[1] The foregoing test muds were aged 16 hours at 70° C.
[2] The foregoing test muds were aged 3 hours at 190° C.

*Example IX*

The effectiveness of the products of this invention as fluid loss control agents for gypsum muds is demonstrated by this example. In the field, it is common practice to use a viscosity control agent and fluid loss control agents in the same mud. Fluid loss control agents being more expensive are generally used only when necessary. The synergistic effect of the products of this invention in such a case is clearly shown in Table IV. The gypsum mud samples listed therein all contain a commercial viscosity control agent called Rayflo which is essentially a sulfonated bark extract.

Each of the test samples of mud listed in Table IV was prepared by adding 0.4 lb./bbl. NaOH, 5.0 lbs./bbl. $CaSO_4 \cdot 2H_2O$ (gypsum) and 4.0 lbs./bbl. Rayflo to an aliquot of gypsum base mud (B) and stirring the mixture for 5 minutes at high speed. 5.0 lbs./bbl. of the indicated fluid loss control product was then added and mixed in by stirring at high speed for 5 minutes. The mud sample was then transferred to an aging cell and aged for the indicated time and temperature after which it was again stirred for 5 minutes at high speed and tested.

TABLE IV

| Agent Example—Sample | pH of mud | Appar. visc., cps. | Gel strength, lbs./100 sq. ft. | | Fluid loss (API), ml./30 min. |
|---|---|---|---|---|---|
| | | | 0 min. | 10 min. | |
| (Control—Rayflo but no fluid loss control agent) | | | | | 32.0 |
| V—(1) | 8.8 | 12 | 7 | 22 | 5.8 |
| VI—(6) | 8.7 | 19 | 12 | 26 | 6.2 |
| VI—(7) | 9.0 | 17 | 8 | 26 | 5.8 |
| VI—(11)[1] | 8.6 | 21 | 14 | 24 | 6.2 |
| (Control—Rayflo but no fluid loss control agent) | | | | | 32.0 |
| V—(1) | 8.0 | 16 | 11 | 21 | 6.0 |
| VI—(6) | 8.2 | 19 | 9 | 22 | 6.4 |
| VI—(7) | 8.2 | 18 | 11 | 20 | 6.2 |
| VI—(8) | 8.1 | 14 | 8 | 15 | 6.8 |
| VI—(11)[2] | 8.0 | 21 | 9 | 21 | 6.4 |
| (Control—Rayflo but no fluid loss control agent) | | | | | 28.0 |
| V—(1) | 8.0 | 24 | 4 | 18 | 10.0 |
| VI—(7)[3] | 8.0 | 18 | 6 | 16 | 8.6 |

[1] Mud Samples aged 16 hours at room temperature.
[2] Mud samples aged 16 hours at 70° C.
[3] Mud samples aged 3 hours at 190° C.

Example X

A type of mud that is being used with increasing frequency of late is sea water mud. This example demonstrates the unusual effectiveness of the products of this invention when used as fluid loss control agents therein.

Mud test samples were prepared by adding 0.4 lb./bbl. NaOH and the indicated amounts of Rayflo (viscosity control agent) to aliquots of sea water base mud (C) and mixing at high speed for 5 minutes. The indicated amounts of the several products of this invention were then added and the mixtures restirred, placed in an aging cell, aged, stirred and tested as in the preceding two examples.

Table VII shows how the ability to resist the adverse effect of high temperature is present when sea water muds are treated with the products of the invention. The mud test samples in this case were prepared by adding the indicated amounts of fluid loss control agents to aliquots of sea water base mud (C) and stirring the mixture at high speed for 5 minutes. The samples were then aged for 3 hours at 190° C. in aging cells, stirred for 5 minutes and tested. (It will be noted that a smaller amount of CMC is used in the various tests than of the other agents. Actually larger amounts of CMC would not have a beneficial effect as it breaks down at the higher temperature. Larger quantities also have an extremely adverse effect on viscosity and gel strength. Finally, in the field lesser amounts of CMC are always used as it is considerably more expensive than either of the other two materials.)

TABLE V

| Agent Example—Sample | Amt. added, lbs./bbl. | Rayflo added, lbs./bbl. | pH of mud | Appar. visc., cps. | Gel strength, lbs./100 sq. ft. | | Fluid loss (API), ml./30 min. |
|---|---|---|---|---|---|---|---|
| | | | | | 0 min. | 10 min. | |
| (Control: 3 lbs./bbl. Rayflo, no fluid loss control agent) | | | | | | | 26.0 |
| VI—(6) | 5 | 3 | 8.2 | 25 | 22 | 28 | 6.4 |
| VI—(11) [1] | 5 | 3 | 8.1 | 28 | 22 | 39 | 6.8 |
| (Control: 3 lbs./bbl. Rayflo, no fluid loss control agent) | | | | | | | 26.0 |
| VI—(6) | 5 | 3 | 7.5 | 28 | 20 | 42 | 6.0 |
| VI—(11) [2] | 5 | 3 | 7.3 | 30 | 22 | 42 | 6.6 |
| (Control: 2 lbs./bbl. Rayflo, no fluid loss control agent) | | | | | | | 24.6 |
| V—(1) | 3 | 2 | 7.6 | 26 | 21 | 26 | 10.0 |
| VI—(5) [3] | 1 | 2 | 8.6 | 16 | 16 | 30 | 9.3 |

[1] Mud samples aged 16 hours at room temperature.
[2] Mud samples aged 16 hours at 70° C.
[3] Mud samples aged 16 hours at 70° C.

Example XI

One of the more striking advantages of the products of the present invention is their lack of sensitivity to heat. This valuable property is well illustrated by a comparison of the effectiveness of our products with that of carboxymethylcellulose (CMC) and starch, two of the most commonly used fluid loss control agents in the field. Table VI shows a comparison of the three materials in a salt contaminated gypsum mud after aging the mud samples for 3 hours at 190° C.

The mud test samples were prepared by adding 0.6 lb./bbl. NaOH, 10.5 lbs./bbl. NaCl, 5.0 lbs./bbl. $CaSO_4 \cdot 2H_2O$, 4.0 lbs./bbl. Rayflo and 35 lbs./bbl. diesel oil (10%) to aliquots of gypsum base mud (B) and stirring the mixture for 5 minutes at high speed. The indicated amounts of the 3 fluid loss control agents were then added and stirred in for 5 minutes at high speed. They were then aged for 3 hours at 190° C., stirred once more at high speed for 5 minutes and tested.

TABLE VI

| Additive | Amount, lbs./bbl. | pH of mud | Appar. visc., cps. | Gel strength, lbs./100 sq. ft. | | Fluid loss (API), ml./30 min. |
|---|---|---|---|---|---|---|
| | | | | 0 min. | 10 min. | |
| Control | None | 7.8 | 24 | 28 | 25 | 32.0 |
| VI—(6) | 2 | 7.6 | 25 | 19 | 19 | 24.3 |
| VI—(6) | 4 | 7.8 | 28 | 19 | 21 | 16.8 |
| VI—(6) | 8 | 7.6 | 25 | 15 | 32 | 9.3 |
| Starch | 2 | 7.6 | 24 | 19 | 17 | 31.2 |
| Do | 4 | 7.5 | 22 | 16 | 17 | 32.0 |
| Do | 8 | 7.4 | 24 | 16 | 18 | 32.8 |
| CMC | 2 | 7.8 | 27 | 27 | 25 | 30.0 |

TABLE VII

| Additive type | Amount, lbs./bbl. | pH of mud | Appar. visc., cps. | Gel strength, lbs./100 sq. ft. | | Fluid loss (API), ml./30 min. |
|---|---|---|---|---|---|---|
| | | | | 0 min. | 10 min. | |
| Control | None | 6.6 | 32 | 57 | 35 | 34.3 |
| VI—(6) | 8 | 7.2 | 21 | 11 | 18 | 8.0 |
| Starch | 8 | 7.7 | 21 | 15 | 14 | 45.5 |
| CMC | 2 | 7.9 | 21 | 17 | 20 | 41.5 |

In the foregoing it will be noted that starch and CMC under the given conditions not only do not lower fluid loss but actually increase it.

I have found that the ability of my products to resist the adverse effects of high temperature will continue over long periods of time. Tables VIII and IX illustrate this fact. Mud test samples for the results listed in both tables were prepared by adding 1.2 lbs./bbl. NaOH, 5.0 lbs./bbl. $CaSO_4 \cdot 2H_2O$ and 35 lbs./bbl. of diesel oil to aliquots of gypsum mud base (B) and mixing at high speed for 5 minutes. The additive was then mixed in and the samples aged at the indicated temperatures for the given times, remixed and tested as before. The results tabulated in Table VIII are pictured graphically in FIGURE 1 and those in Table IX in FIGURE 2.

TABLE VIII

| Additive type | Amount, lbs./bbl. | Fluid loss, mls./30 min. (API) measured after aging for 3 hours at— | | | |
|---|---|---|---|---|---|
| | | 120° C. | 150° C. | 176° C. | 215° C. |
| Control | None | 55.1 | 52.0 | 50.8 | 47.0 |
| VI–(6) | 4 | 10.3 | 12.8 | 13.4 | 14.9 |
| Starch | 4 | 11.4 | 17.0 | 21.6 | 45.2 |
| CMC | 4 | 12.5 | 15.9 | 18.6 | 44.5 |

TABLE IX

| Additive type | Amount, lbs./bbl. | Fluid loss, mls./30 min. (API) measured after aging at 190° C. for— | | | | |
|---|---|---|---|---|---|---|
| | | 3 hrs. | 5 hrs. | 7 hrs. | 11 hrs. | 24 hrs. |
| Control | None | 39.6 | 34.0 | 33.3 | 32.0 | 31.0 |
| VI–(6) | 8 | 6.8 | 7.4 | 7.3 | 7.6 | 8.8 |
| Starch | 8 | 5.1 | 12.5 | 28.0 | (¹) | (¹) |
| CMC | 4 | 13.3 | 24.4 | 29.0 | (¹) | (¹) |

¹ Additive completely ineffective.

*Example XII*

There is a need in the drilling industry for additives that lower fluid loss in Portland cement slurries. When the rate of fluid loss to the formation goes down, the slurries have more predictable setting times, can be more easily pumped and spotted in the hole and the danger of premature setting lessened. Formation damage from contamination with aqueous drilling fluids is also reduced. In this connection, I have discovered that the use of small amounts of the products of this invention (particularly those that have been condensed less extensively) will lower the fluid loss characteristics of Portland cement slurry drastically with a minimum of adverse side effects such as increased viscosities, etc. Table IX shows the beneficial effects obtained by the addition of from 0.3 to 3.3% (based on the weight of the dry cement) of product Example VI, sample 9, to such a slurry.

The test slurries were prepared by mixing 300 parts of Portland cement with 140 parts water for 5 minutes at high speed. The indicated amount of the additive was then added and the slurry mixed again for 5 minutes at high speed and the fluid loss determined. The fluid loss values were determined by the same API method used for the drilling muds of the preceding examples. It will be noted from the values in the table that the fluid loss of the slurry dropped from over 100 mls./30 mins. to 3 mls./30 mins. upon the addition of only 3.3% of the product.

TABLE IX

| Additive | Amount, lbs./bbl. | Visc., cps. | Fluid loss (API), mls./30 min. |
|---|---|---|---|
| Control | None | 44 | 100+ |
| VI–(9) | 2 | 27 | 50 |
| VI–(9) | 4 | 31 | 10 |
| VI–(9) | 6 | 33 | 6 |
| VI–(9) | 8 | 50 | 4 |
| VI–(9) | 10 | 51 | 3 |

I claim:

1. The process of forming a polymeric lignin-phenolic complex which comprises partially condensing a concentrated sulfited lignin in aqueous solution with alkaline polymethylolphenol having a formaldehyde-to-phenol mole ratio of from 2.0 to 3.0 and controlling the reaction by means of the temperature and time of treatment to prevent the viscosity of the complex from rising so high as to form a water-insoluble complex.

2. In the process of claim 1, using a ligno-sulfonate from the spent liquor resulting from the sulfite digestion of wood.

3. In the process of claim 1, using a lignin from the alkaline digestion of wood which was separated from the liquor and sulfited.

4. In the process of claim 1, using a sulfited lignin prepared by sulfiting an alkaline black liquor.

5. In the process of claim 1, using such an amount of polymethylolphenol that the phenol therein varies from 0.05 to 1 part per part of sulfited lignin.

6. The process of forming a polymeric lignin-phenolic complex which comprises reacting a sulfited lignin of the spent liquor from the digestion of wood concentrated to a total solids content of 20% to 50% with a polymethylolphenol having a formaldehyde-to-phenol mole ratio of from 2.0 to 3.0 in aqueous alkaline solution, permitting the condensation reaction to proceed only to the point where the complex approaches water-insolubility.

7. In the process of claim 6, evaporating the water and forming a free-flowing dry powder.

8. In the process of claim 6, the use of sodium sulfite in ratios of 0.05 to 0.5, based on the weight of the sulfited lignin solids as a means of controlling the course of the condensation process and the extent thereof.

9. The process of claim 6 which comprises providing a sulfited lignin obtained by precipitating lignin from the spent black liquor from the alkaline digestion of wood, sulfiting the precipitate and dissolving it in such an amount of water that the total solids vary from 20% to 50%.

10. The process of claim 6 which comprises using a polymethylolphenol the major portions of which consist of the dimer and trimer stages.

11. The process of forming a lignosulfonatephenolic product which comprises mixing together an aqueous solution comprising sulfited lignin containing from 20 to 50% of total solids, an aqueous solution of alkaline polymethylolphenol having a formaldehyde-to-phenol mole ratio of from 2.0 to 3.0 containing about 45% of total solids, in the ratio of 100 parts of lignin liquor solids to from 19 to 38 parts of polymethylolphenol solids, and a minor part of sodium sulfite, heating the solution mixture to an elevated temperature until the viscosity indicates the close approach to water insolubility, stopping the reaction, and evaporating the water to form a dry powder.

12. In the process of claim 11, carrying out the reaction until the product has a viscosity of from 10 to 1000 poises when measured at 25° C. and a total solids of 25%.

13. The water-soluble polymeric lignin-phenolic complex resulting from the reaction of sulfited lignin with alkaline polymethylolphenol having a formaldehyde-to-phenol mole ratio of from 2.0 to 3.0, while retaining water solubility.

References Cited in the file of this patent

UNITED STATES PATENTS

| | | |
|---|---|---|
| 2,491,436 | Barnes | Dec. 13, 1949 |
| 2,649,414 | Salathiel | Aug. 18, 1953 |
| 2,681,312 | Salathiel | June 15, 1954 |
| 2,786,820 | Uschmann | Mar. 26, 1957 |
| 2,823,135 | Toulmin | Feb. 11, 1958 |
| 2,872,329 | Scripture | Feb. 3, 1959 |
| 2,878,197 | Baxter et al. | Mar. 17, 1959 |
| 2,891,918 | Uschmann | June 23, 1959 |

OTHER REFERENCES

Indulin: Bulletin L–6 of W. Va. Pulp & Paper Co., 230 Park Ave., N.Y., 1951 (pages 6–7, 27 and 40).